Jan. 3, 1956 T. B. EDWARDS 2,729,295
REMOTE CONTROL FIRE-FIGHTING TURRET AND NOZZLE
Filed Feb. 20, 1953 11 Sheets-Sheet 1
Fig.1.
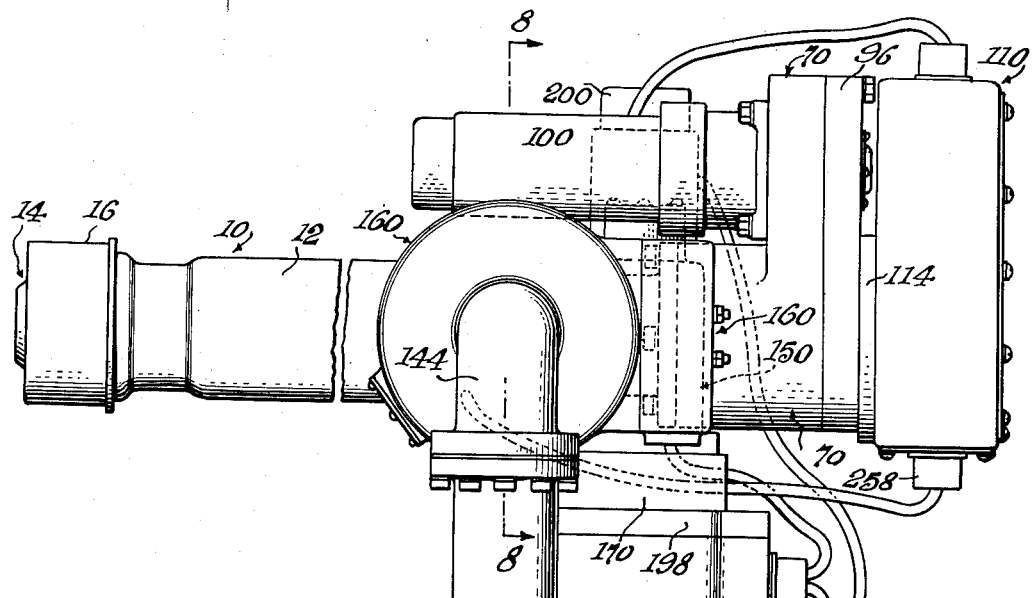
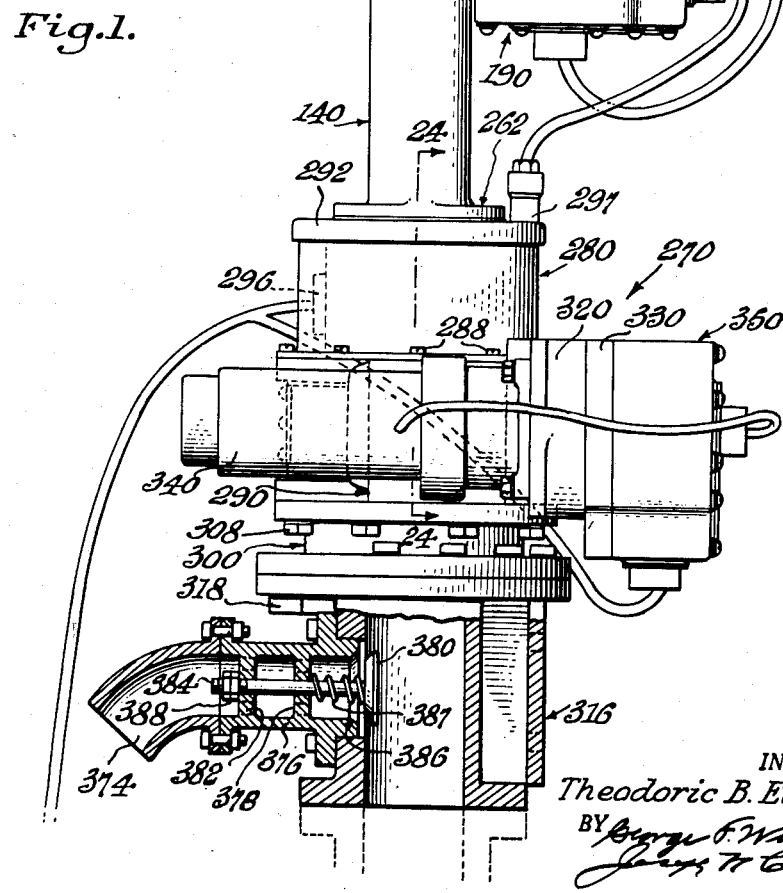
INVENTOR.
Theodoric B. Edwards
BY
ATTORNEYS INVENTOR.
Theodoric B. Edwards

BY

ATTORNEYS

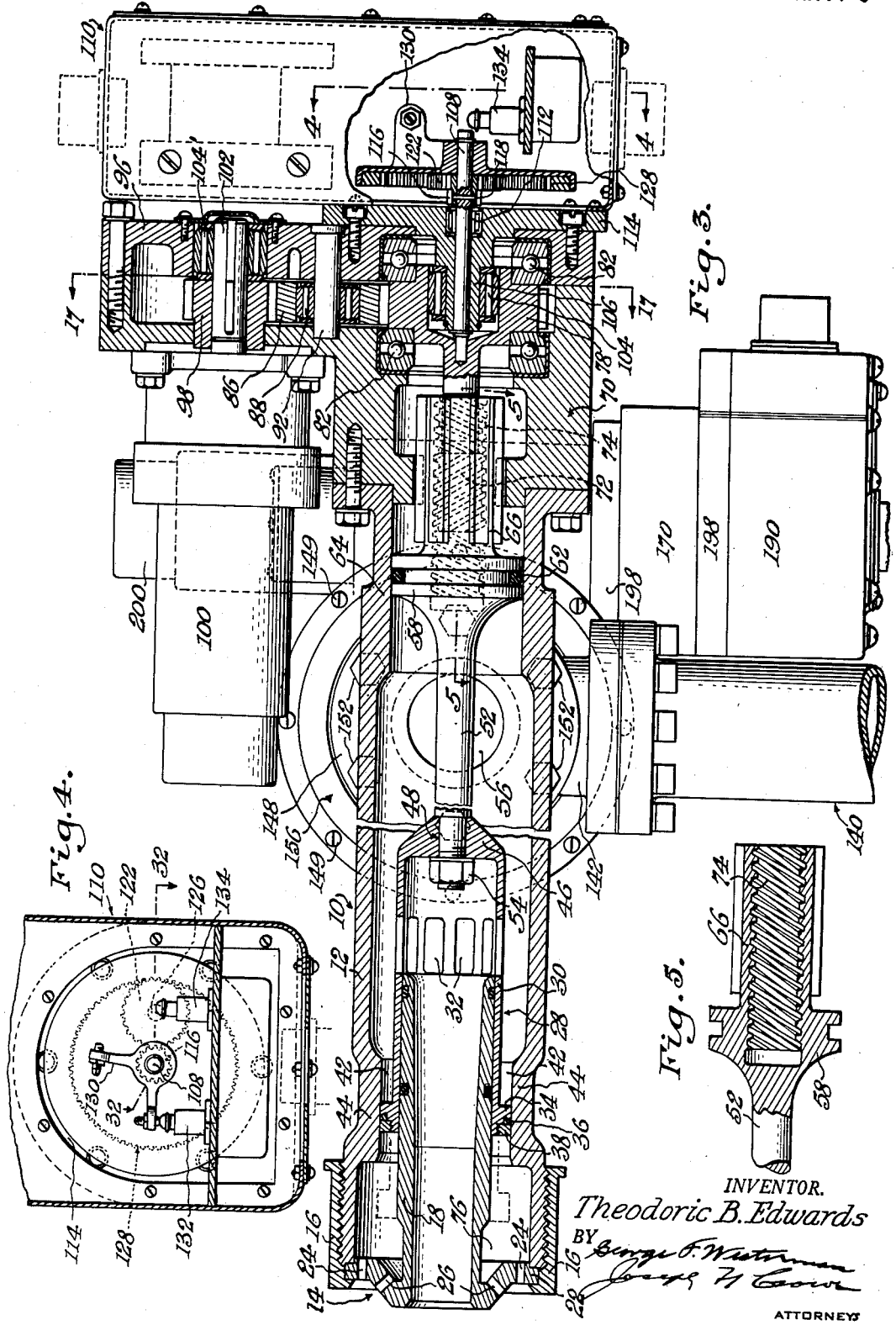

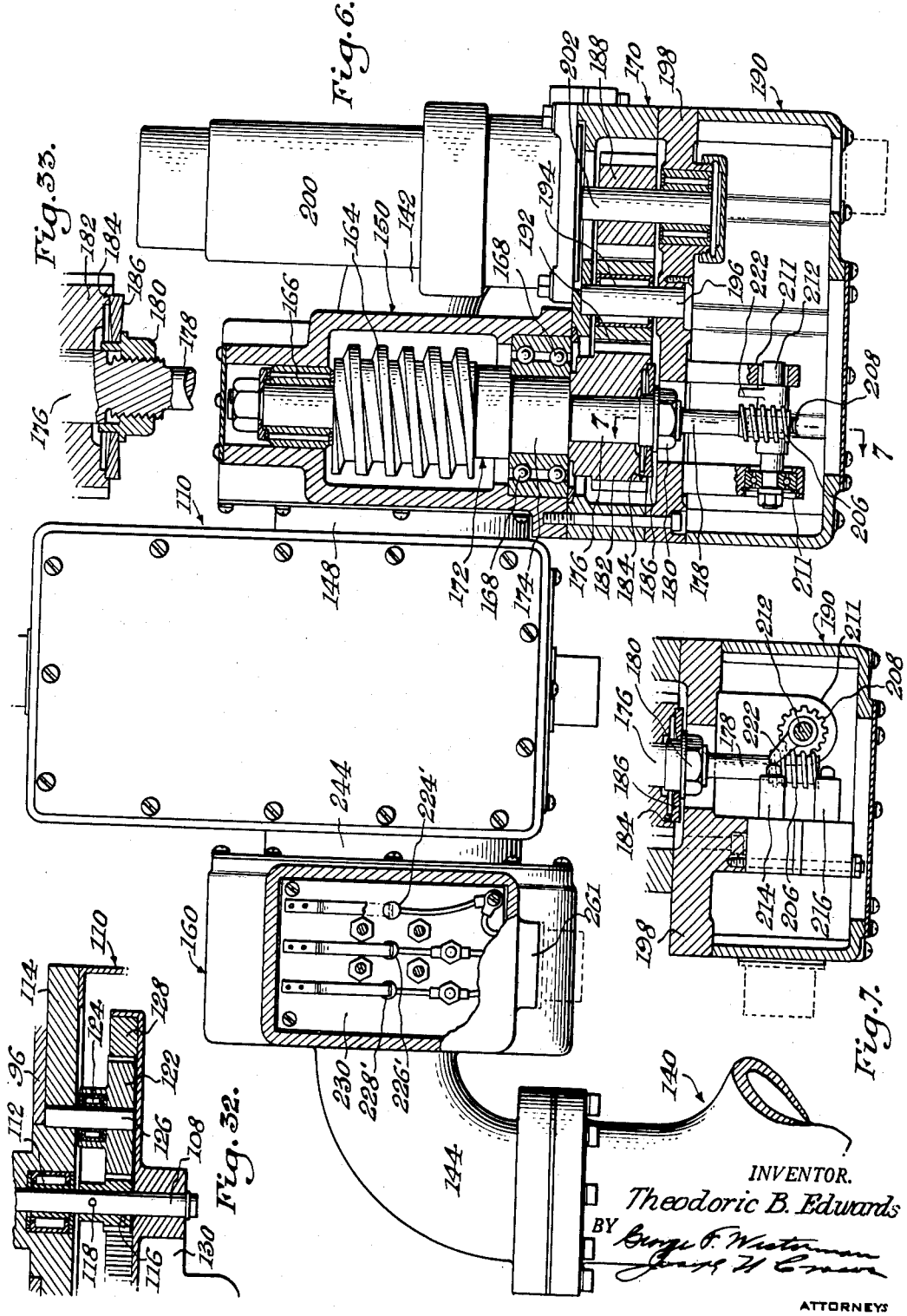

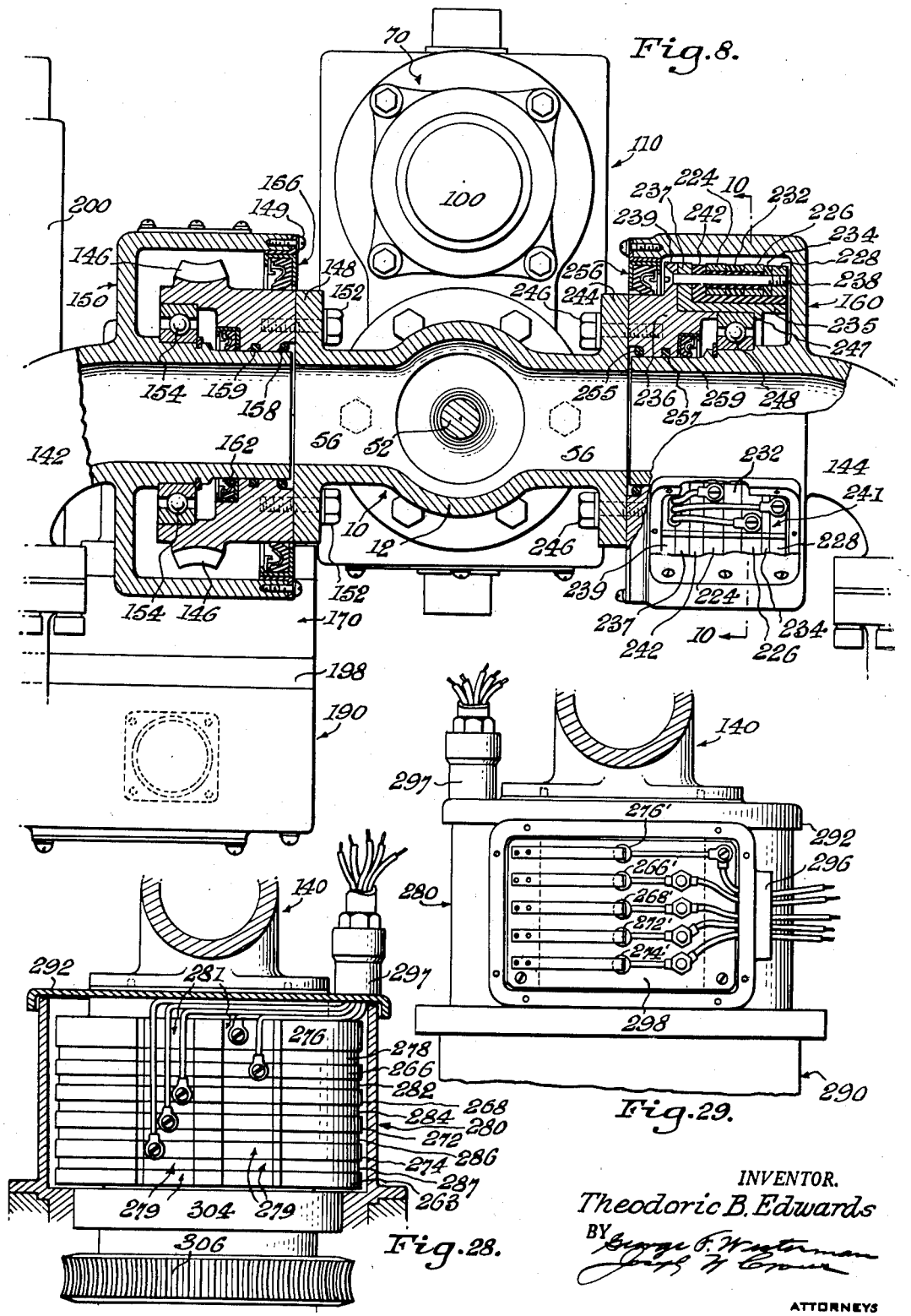

Jan. 3, 1956 T. B. EDWARDS 2,729,295
REMOTE CONTROL FIRE-FIGHTING TURRET AND NOZZLE
Filed Feb. 20, 1953 11 Sheets-Sheet 6
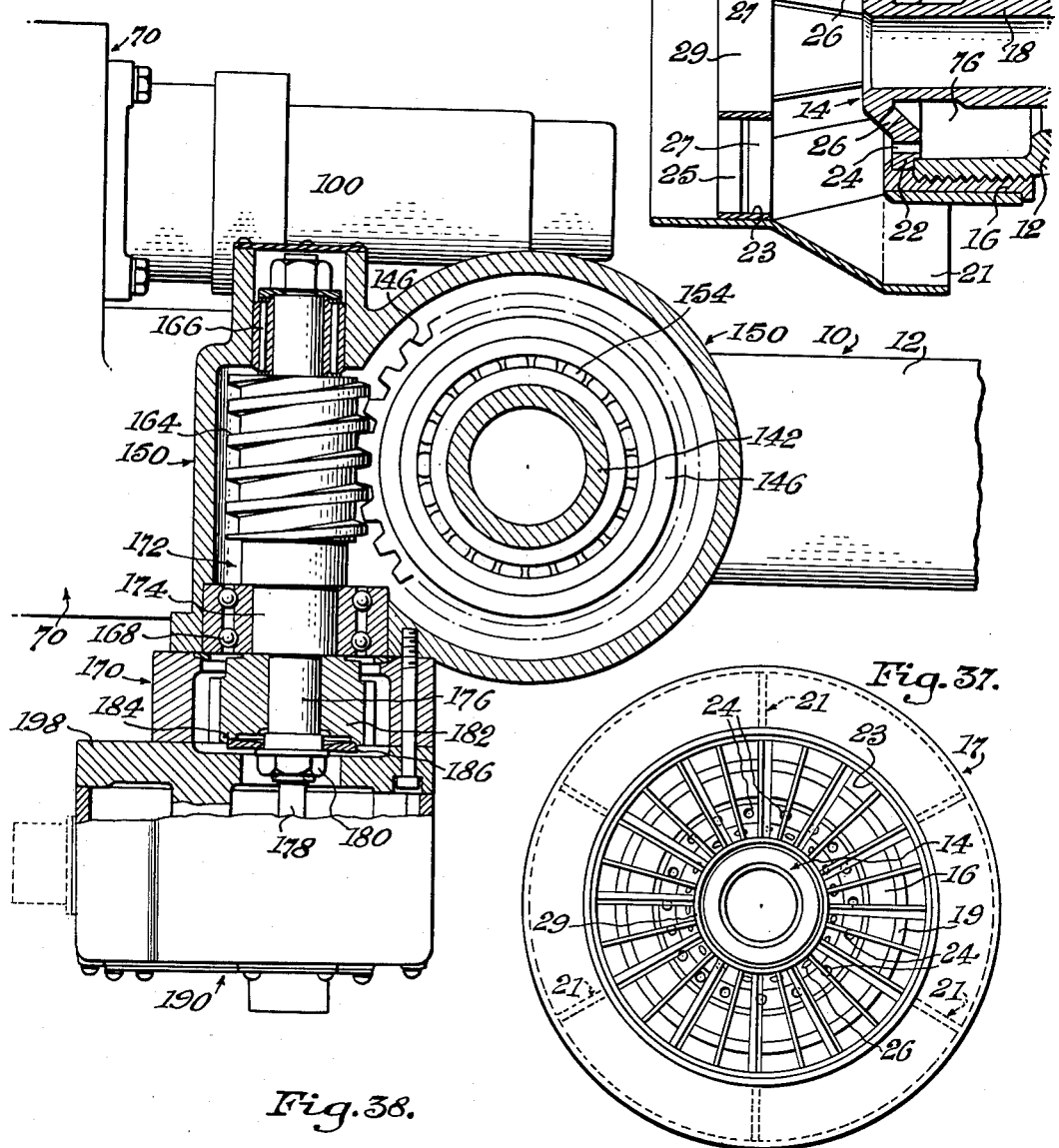
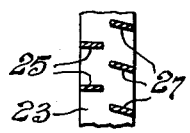
INVENTOR.
Theodoric B. Edwards
ATTORNEYS

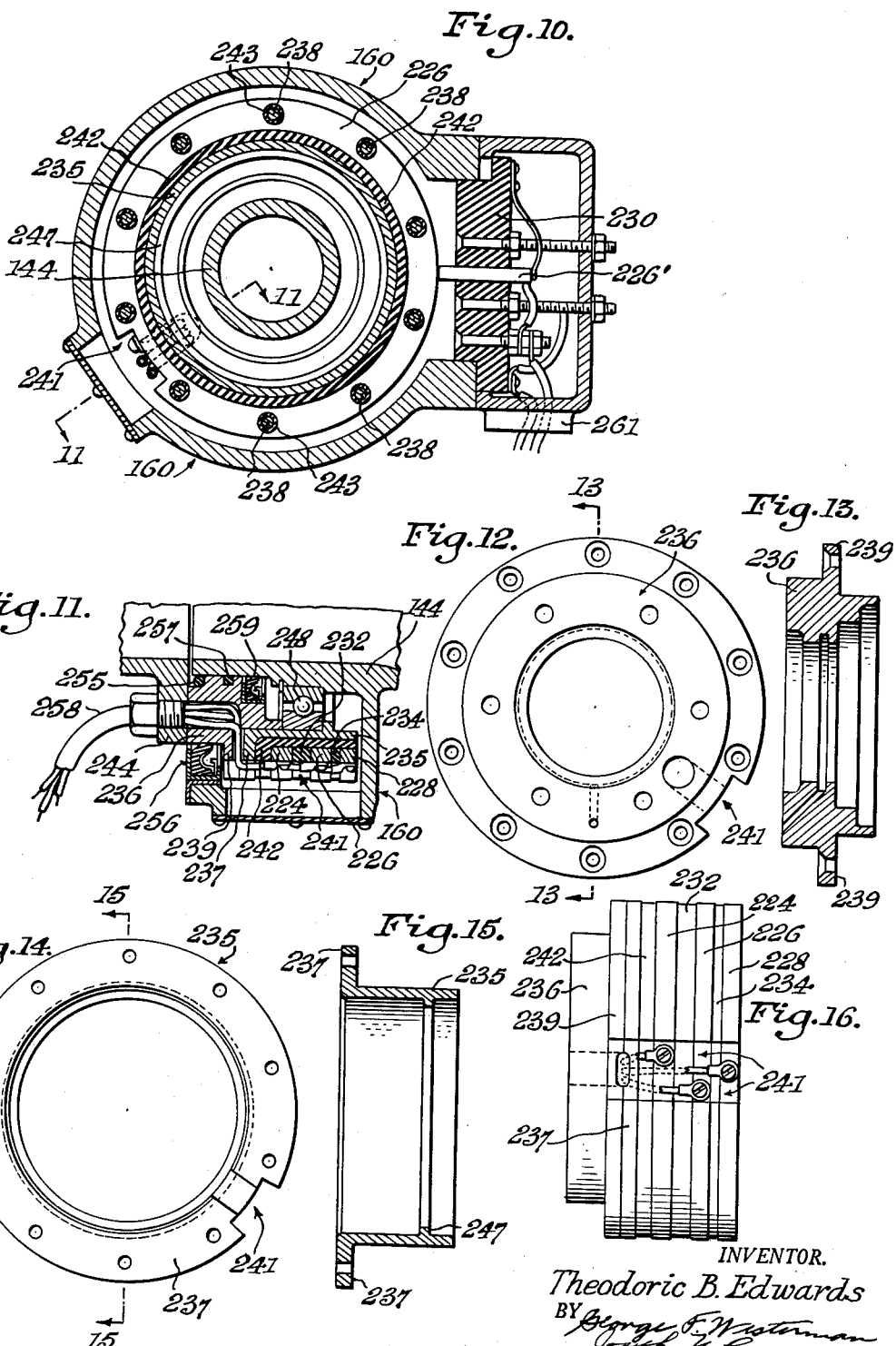

Jan. 3, 1956  T. B. EDWARDS  2,729,295
REMOTE CONTROL FIRE-FIGHTING TURRET AND NOZZLE
Filed Feb. 20, 1953  11 Sheets-Sheet 8
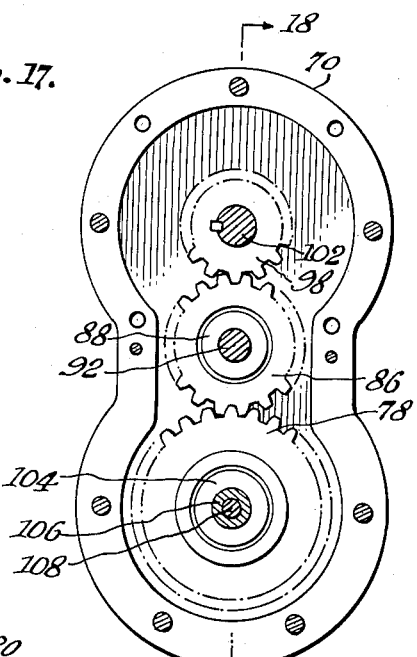
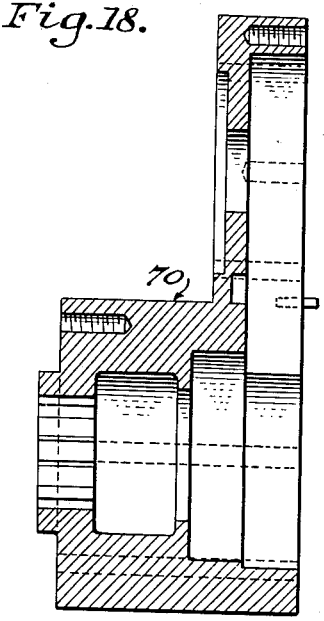
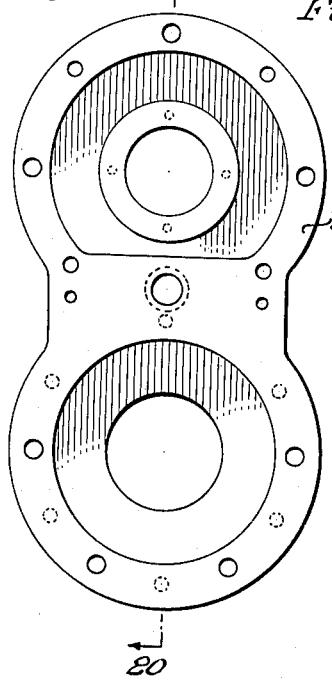
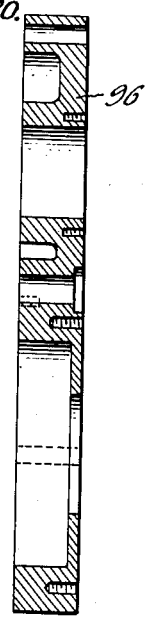
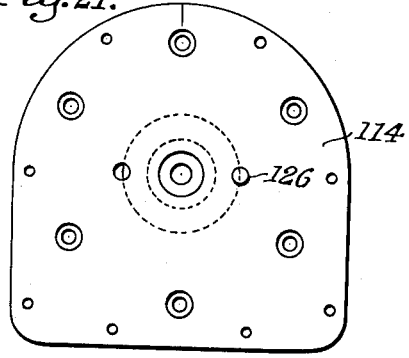
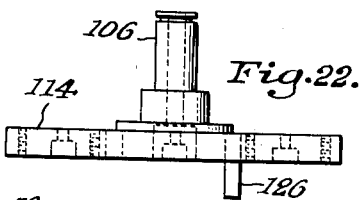
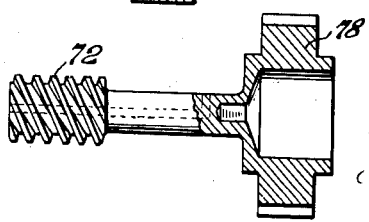
INVENTOR.
Theodoric B. Edwards
BY
ATTORNEYS

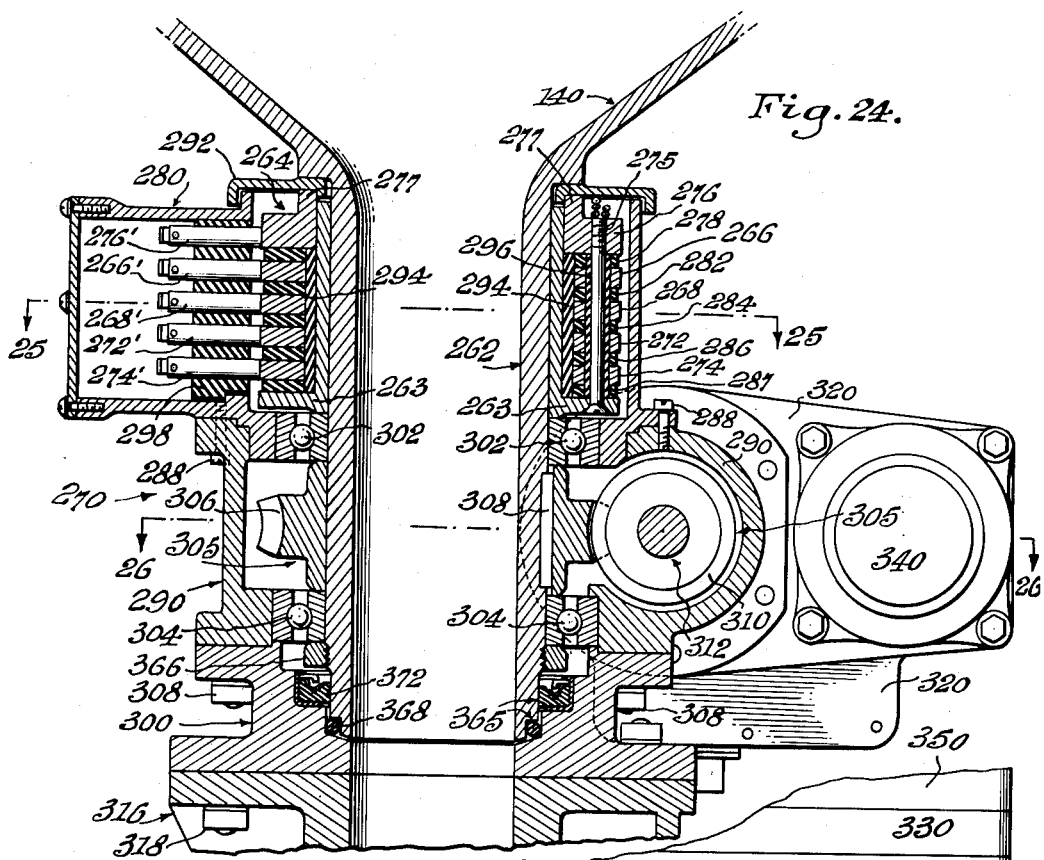
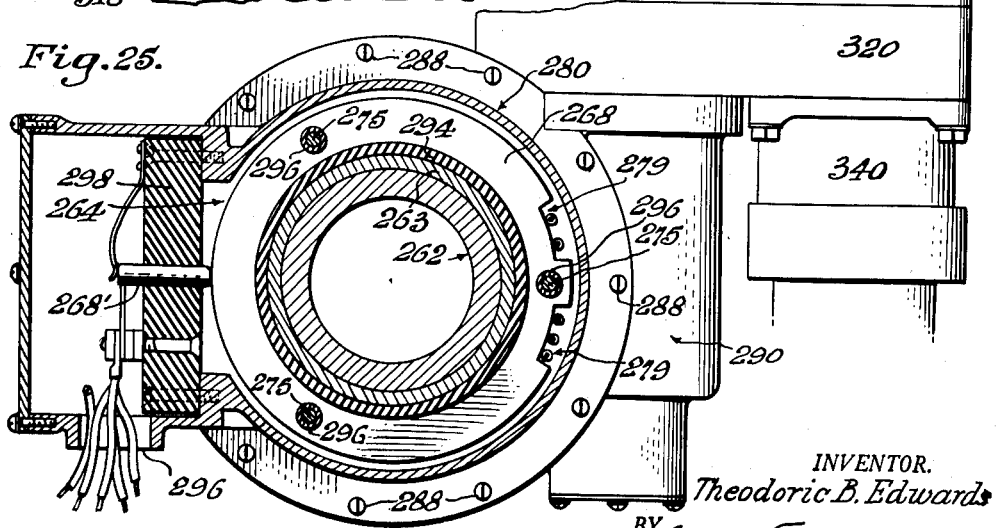

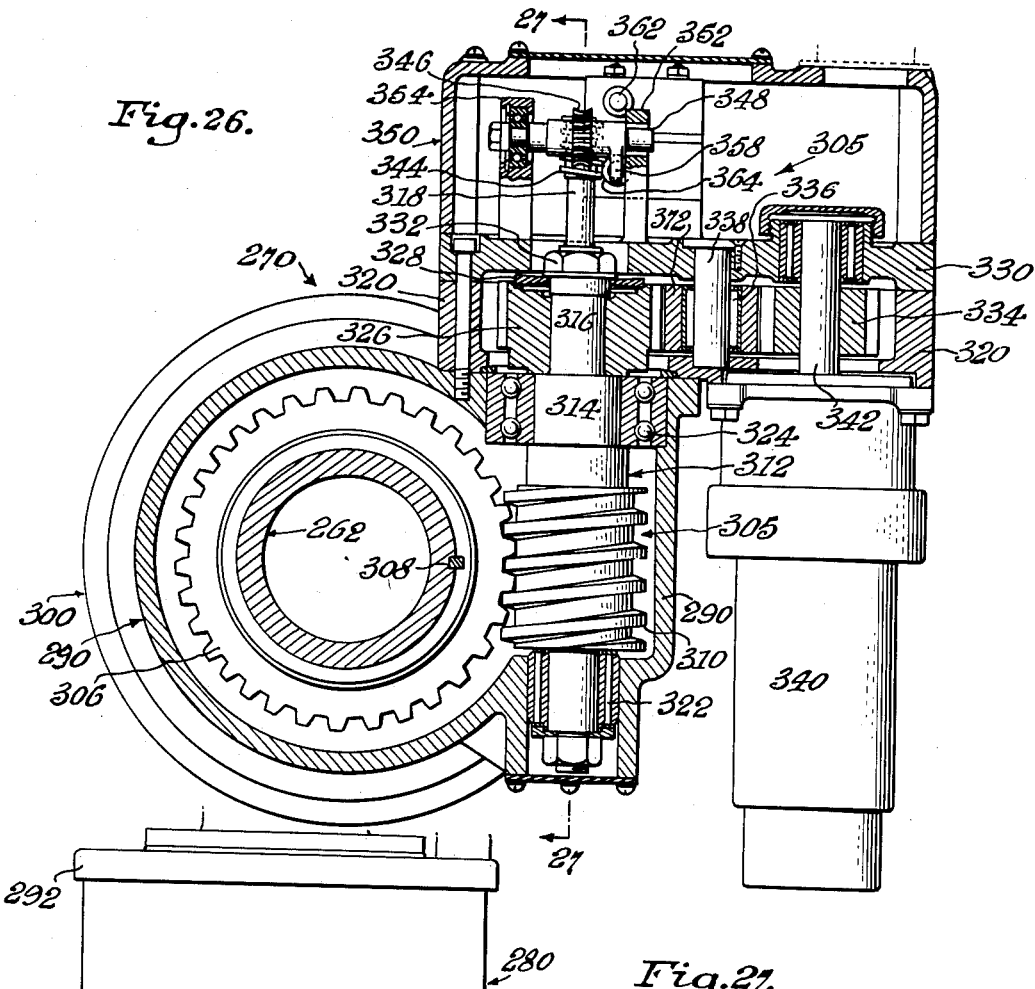
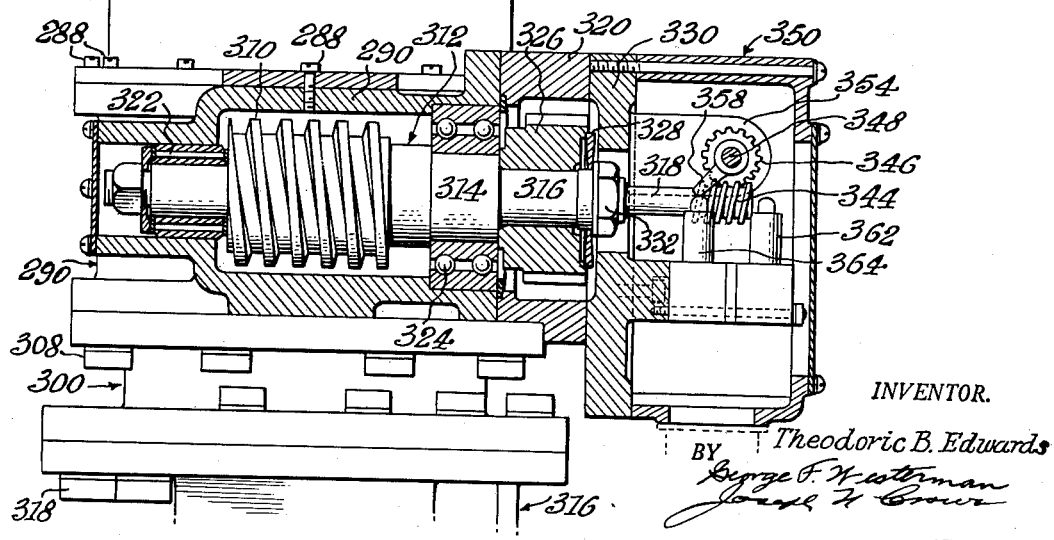

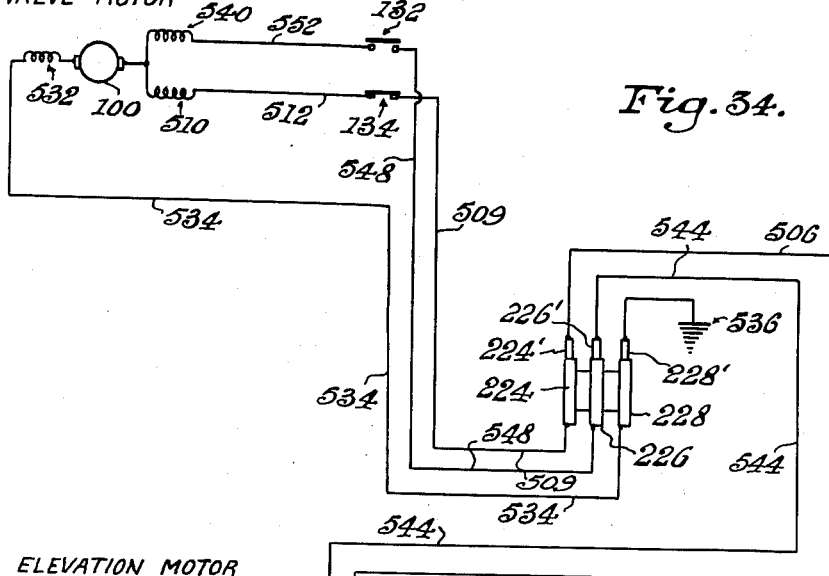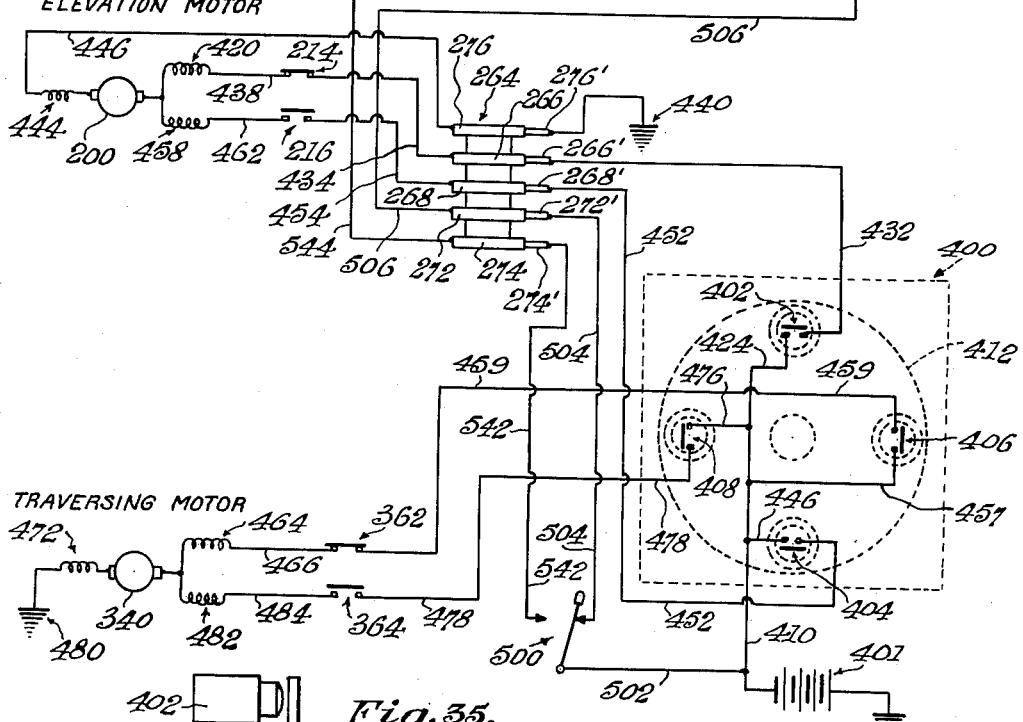

United States Patent Office 2,729,295
Patented Jan. 3, 1956

2,729,295
REMOTE CONTROL FIRE-FIGHTING TURRET AND NOZZLE

Theodoric B. Edwards, Alexandria, Va.

Application February 20, 1953, Serial No. 338,173

20 Claims. (Cl. 169—25)

(Granted under Title 35, U. S. Code (1952), sec. 266)

The invention described herein may be manufactured and used by or for the Government for governmental purposes, without payment to me of any royalty thereon.

The present invention provides an improvement in fire fighting apparatus. More particularly, the instant invention is concerned with a remote-controlled fire fighting turret especially designed for complete operation at a control position remote from the turret to produce either a fire-fighting stream or a fog under extremely low temperature conditions with means to prevent freezing of the operative parts of the apparatus subjected to the residue of fire-fighting fluid when its use is discontinued.

It is an object of this invention to provide a simple, positive and reliable arrangement for directing fluid from a fire-fighting turret either as a continuous stream, fog, or spray from one or more remote control points, thus enabling the operator to be in a safer and more convenient location with respect to the fire-fighting turret.

It is another object of this invention to provide electrical control means for complete operation of the fire-fighting turret at a control point remotely located with respect to the turret.

It is a further object of this invention to provide a nozzle for a fire-fighting turret which with convenience can be controlled at a point remote from the turret to produce either a continuous stream or a fire-fighting fog.

A still further object of this invention is to provide a fire-fighting turret and nozzle which can be operated under extreme climatic conditions, such as in arctic regions, without a freezing of the working parts subjected to the residue of fire-fighting fluid retained by the turret when its use is discontinued.

In the drawings:

Fig. 1 is a side elevation of the fire-fighting turret with a detailed showing in section of the hot air intake port system;

Fig. 3 is a vertical sectional view of the upper portion of the fire-fighting turret showing the nozzle assembly in detail, the section being taken along line 3—3 of Fig. 2;

Fig. 4 is a detailed sectional view of the nozzle slide valve control switch assembly, the section being taken along line 4—4 of Fig. 3;

Fig. 5 is a detailed sectional view of the connection between the nozzle slide valve connecting rod and gearing assembly, the section being taken along line 5—5 of Fig. 3;

Fig. 6 is a rear elevation of the upper portion of the fire-fighting turret showing the nozzle elevating assembly in section with the collector ring housing cut away to disclose the wiring connections of the collector rings;

Fig. 7 is a detailed sectional view of the elevating control switch assembly, the section being taken along line 7—7 of Fig. 6;

Fig. 8 is a vertical sectional view of the upper portion of the fire-fighting turret, the section being taken along line 8—8 of Fig. 1;

Fig. 9 is a vertical sectional view of the nozzle elevating assembly, the section being taken along line 9—9 of Fig. 2;

Fig. 10 is a transverse sectional view of the nozzle elevating collector ring assembly, the section being taken along line 10—10 of Fig. 8;

Fig. 11 is a detailed sectional view of a portion of the nozzle collector ring assembly showing the electrical passage for the electrical conductors to the collector rings, the section being taken along line 11—11 of Fig. 10;

Fig. 12 is an elevational view of the collector ring hub as shown in Figs. 8 and 11;

Fig. 13 is a sectional view of the collector ring hub, the section being taken along line 13—13 of Fig. 12;

Fig. 14 is a detailed elevational view of the collector ring sleeve also shown in Fig. 8;

Fig. 15 is a sectional view of the ring collector hub taken along line 15—15 of Fig. 14;

Fig. 16 is a side view of the nozzle collector ring drum completely assembled with collector rings and leads therefor also shown in Fig. 8;

Fig. 17 is a vertical sectional view of the nozzle actuating gearing assembly, the section being taken along line 17—17 of Fig. 3;

Fig. 18 is a sectional view of the nozzle gearing assembly housing, the section being taken along line 18—18 of Fig. 17;

Fig. 19 is a plan view of the nozzle gear housing closure plate;

Fig. 20 is a vertical sectional view of the nozzle gear housing closure plate, the view being taken along line 20—20 of Fig. 19;

Fig. 21 is a rear elevation showing the nozzle slide valve control switch plate also shown in Fig. 3;

Fig. 22 is a plan view of the nozzle slide valve control switch plate shown in Fig. 3;

Fig. 23 is a detailed sectional view, a portion thereof shown in elevation, of the nozzle slide valve actuating gear and worm, also shown in Fig. 3;

Fig. 24 is a sectional view of an intermediate portion of the fire-fighting turret assembly showing the fire-fighting traversing assembly, the section being taken along line 24—24 of Fig. 1;

Fig. 25 is a horizontal sectional view of the main collector ring assembly for the fire-fighting turret, the section being taken along line 25—25 of Fig. 24;

Fig. 26 is a horizontal sectional view of the fire-fighting turret traversing gearing assembly, the section being taken along line 26—26 of Fig. 24;

Fig. 27 is a vertical section of the fire-fighting turret traversing gearing assembly, the section being taken along line 27—27 of Fig. 26;

Fig. 28 is a side elevation of the main collector ring assembly having the housing therefor shown in section and showing the power takeoff leads connected to the collector rings together with their passage from the housing;

Fig. 29 is a side view of the main collector ring assembly showing the power input leads and brushes;

Fig. 32 is a detailed horizontal sectional view of the gearing system provided for the nozzle slide valve control switch, the section being taken along line 32—32 of Fig. 4;

Fig. 33 is a detailed sectional view of the transverse and elevating gearing mechanism safety device also shown in Figs. 6, 9, 26 and 27;

Fig. 34 is a schematic wiring diagram of the electrical circuits involved in the fire-fighting turret;

Fig. 35 is a detailed view of the control box switch selector shaft and disc;

Fig. 36 is a sectional view showing a modified form of a foam attachment attached to the nozzle;

Fig. 37 is a front elevation of the modified form of fog attachment shown in Fig. 36; and Fig. 38 is a detailed sectional view of the modified form of fog attachment taken along line 38—38 of Fig. 36.

Briefly, the present invention presents a remotely controlled fire-fighting turret consisting of a base supporting a turret capable of horizontal revolution and on which is pivotally mounted a nozzle of the type which will produce either a continuous fire-fighting stream or a fire-fighting fog in combination with a control means, which is remote from the fire-fighting turret but in operative association with the said nozzle and turret, for selectively producing a desired form of fire-fighting fluid and directing this fluid in any desired direction.

Figure 2:
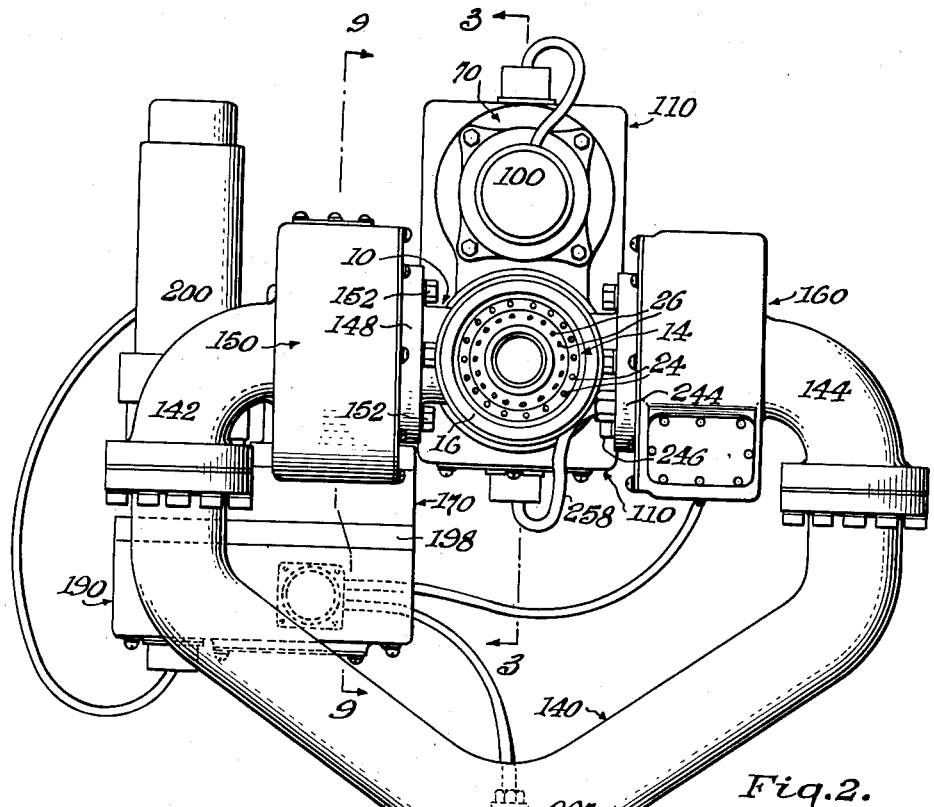
Fig. 2 is a front elevation of the fire-fighting turret as viewed from the left in Fig. 1.
Figure 30:
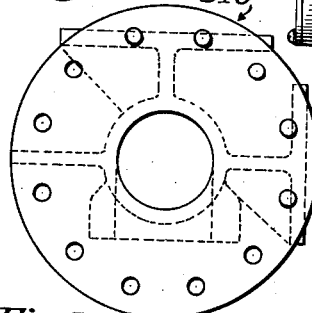
Fig. 30 is a top view of the fire-fighting turret support.
Figure 31:
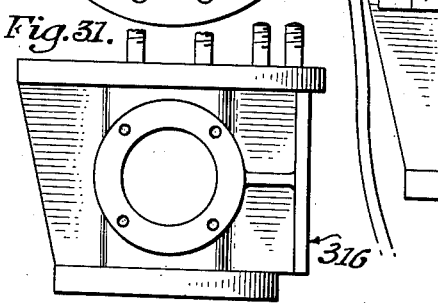
Fig. 31 is a side elevation of the fire-fighting turret support.

Referring now to the drawings in connection with a more specific description of the embodiment of the present mechanism, which as shown in Figures 1 and 2 is arranged in housings which are connected one with the other to form single assembly units hereinafter described.

In Figure 1 the numeral 10 indicates a nozzle assembly including a slide valve gearing housing 70 having a nozzle barrel 12 operatively connected to a lower portion and a motor 100 connected to an upper portion of the forward end of the housing 70. Attached to the rear end of the housing 70 is a closure plate 96 having a slide valve control switch housing 110 secured thereto through a switch plate 114.

Figure 2 illustrates the nozzle assembly 10 supported by a Y yoke assembly 140 including a pair of arms 142 and 144 extending from a trunk 262. Integral with the ends of the arms 142 and 144 are a pair of housings 150 and 160 housing a nozzle elevating worm and an electrical collector ring assembly respectively. The operation of the worm and collector ring assembly will become apparent as the description proceeds.

The nozzle elevating worm housing 150 interconnects the nozzle to the nozzle elevating housing assembly which includes besides the nozzle elevating worm housing a gear housing 170 having a motor 200 connected to its topside and a closure plate 198 attached to its lower side with a worm control switch housing 190 secured to the lower side of the closure plate 198.

The trunk 262 of the yoke assembly as shown in Figures 1, 2 and 24 is seated within a trunk housing assembly 270 supported by a turret support 316 and secured thereto by bolts 318. The trunk housing assembly 270 consists of a main collector ring housing 280 covered with a cap 292 and connected by screws 288 to the top of a traversing worm housing 290 which has a seal ring housing 300 connected by bolts 308 to its lower end completing the housing assembly 270.

The traversing worm housing 290 interconnects a turret traversing housing assembly to the yoke means and includes a gear housing 320 (Fig. 2) attached at one end to the traversing worm housing with a closure plate 330 secured to its other end. A motor 340, which is secured to the upper portion of the side of the housing 320 carried by the worm housing, and a traversing worm switch control housing 350 secured to the closure plate 330, completes the housings for the turret traversing assembly.

*Nozzle assembly*

Referring now to Fig. 3 of the drawings, in which the nozzle assembly 10 is set forth in detail, and in which the numeral 12 designates a nozzle barrel having a pair of oppositely positioned fluid inlets 56 intermediate its ends. Secured to the forward end of the barrel 12 by an annular retaining sleeve 16, is a fog cap 14 consisting of a centrally located cylindrical tube 18, the inner periphery of which is in the form of a conical nozzle to produce in operation a continuous fire-fighting stream, and a flange 22 integral with the forward end of the cylindrical tube 18. The flange 22 has a plurality of annularly disposed passages 24 passing parallel to the cylindrical tube 18 and a corresponding plurality of passages 26 obliquely directed towards the passages 24 whereby in operation there is caused an impingement between the streams issuing from these passages to produce a fire-fighting fog.

To produce a fire-fighting foam, the fog cap retaining ring 16 is adapted to frictionally receive a foam attachment which, as shown in Figs. 36 and 37, consists of a truncated conical barrel 17 having an annular sleeve 19 which slips over the fog cap retaining ring 16. The sleeve 19 is provided with a plurality of webs 21 so disposed around the sleeve to support the base of the truncated conical barrel and to provide air passages, defined by the said sleeve and base, which lead to the apex of the truncated barrel. The apex of the truncated conical barrel is provided with an annular ring 23 having a plurality of depending vanes 25 which coact with a corresponding plurality of vanes 27 carried by the ring to further break up the impinging streams issuing from the fog cap 14 thereby conditioning same for complete aeration with air admitted through the above-mentioned air passages to produce a fire-fighting foam. The vanes 25 and 27 are provided with a centrally disposed passage defined by a ring 29 which provides a passage for the solid fire-fighting stream issuing from the cylindrical tube 18 when the fire-fighting nozzle is so positioned as hereinafter described.

The cylindrical tube 18 extending within the barrel 12 is partially encased by a cylindrical slide valve 28 consisting of a casing 30 provided with a plurality of symmetrically annularly spaced passages 32 so disposed to provide fluid inlets to the cylindrical tube 18 when the slide valve 28 is in a retracted or solid stream position. The forward end of the casing 30 has an annular flange 34 provided with a sealing ring 36 which is held in place by a retaining ring 38. The flange 34 is adapted to seat within a restricted passage 42 between an intermediate portion of the cylindrical tube 18 and a cylindrical ring portion 44 of barrel 12 formed on the inner periphery of the nozzle barrel 12 adjacent to a fog chamber 76 between the forward portion of the barrel 12 and the corresponding portion of the cylindrical tube 18. The aft end of the slide valve casing 30 is enclosed by means of a casing head 46 integral with the casing and having a centrally disposed passage 48 through which extends one end of a connecting rod 52 having a diameter smaller than the trunk portion of the rod. The extended end of rod 52 is threaded to receive a nut 54 which coacts with the trunk of the rod to provide a connection between the rod and sleeve throughout reciprocation of the rod by the nozzle motor 100. The trunk of the connecting rod 52 extends beyond the fluid inlets 56 of the nozzle assembly 10 where it flares out to form a grooved sealing disc 58 provided with a sealing ring 62 seated in the groove of the disc 58. The sealing disc 58 is reciprocally mounted within a broad ring portion 64 extending inwardly from the inner periphery of the nozzle barrel 12 intermediate the aft end and fluid inlets 56 thereof and defines the working surface for the disc 58, as will become apparent hereinafter. The aft end of the connecting rod 52 is provided with an internally threaded cylinder 66 also shown in Fig. 5 which is externally splined and adapted to be received in complementary recesses provided therefor in the gear housing 70. A worm 72 extends within the threaded cylinder 66 of the connecting rod 52 and engages the threads 74 thereof to impart a reciprocating motion to the rod upon actuation by a gearing assembly which includes a gear 78 integral with one end of worm 72. The gear 78 is positioned by thrust bearings 82 within the gear housing 70 and closure plate 96 and is supported by roller bearings 104 carried by a stub shaft 106 of a switch plate 114. The gear 78 meshes with an idler gear 86 supported by roller bearings 88 carried by a stub shaft 92 of the gear housing closure plate 96 which engages another gear 98 attached to a drive shaft 102 of the motor 100 completing the gearing assembly driven by the said motor. The free end of the drive shaft 102 of the motor 100 is supported by roller bearings 104' carried by the gear housing closure plate 96.

The motor 100 is of the split field series type in which there are two separate field windings. The flow of current through one of the field windings causes the armature to rotate in one direction actuating the worm 72 through the afore-described gearing system to advance the connecting rod 52 advancing thereby the cylindrical slide valve 28 attached to the forward end of the rod and moving its flange 34 from the restricted passage 42 in which it seats, into the fog chamber 76 as shown by the dotted lines in Fig. 3 while simultaneously closing the slide valve passages 32 by advancing same over the cylindrical tube 18. The flow of current through the second of the field windings reverses the motion of the armature to actuate the worm 72 in the reverse direction, thereby returning the cylindrical slide valve 28 to its illustrated position in which the restricted passage 42 is closed by the slide valve flange 34 and the slide valve passages 32 are opened by their removal from over the cylindrical tube 18.

To prevent the operator from exceeding the limits of the worm 72 and to permit full attention to be given to the directing of the fluid from the nozzle to a desired point, a control system is provided, which as shown in Figs. 3 and 32 consists of a drive shaft 108 engaging at one end the worm 72 and extending through the stub shaft 106 and roller bearings 112 of the nozzle control switch housing plate 114 into the nozzle control switch housing 110. To the other end of the shaft 108 is secured a pinion gear 116 by pin 118. The pinion gear 116 meshes with an idler gear 122 which, as shown in Fig. 32, is supported by roller bearings 124 carried by a stub shaft 126 of the switch plate 114. The idler gear 122 in turn meshes with a ring gear 128 loosely mounted upon the drive shaft 108 and circumscribing the idler gear 122 and pinion gear 116. The ring gear 128 carries a bell crank 130 so disposed on the gear to engage electrical switches 132 and 134 when the worm 72 has reached its limits of operation thereby breaking the circuit with the motor 100, de-energizing same to stop the system.

*Yoke assembly*

As previously stated, the nozzle assembly 10 is supported by the yoke assembly 140 which, as shown in Fig. 2, includes arms 142 and 144. The arm 142 supports the elevating gear housing 150 while arm 144 supports the nozzle assembly circuit collector ring housing 160. Referring now to Fig. 8 wherein is shown, within the elevating gear housing 150, a worm wheel 146 secured to a fluid inlet flange 148 of the nozzle barrel 12 by a plurality of bolts 152. The inner periphery of the worm wheel is provided with a recess adapted to receive roller bearings 154 carried by the arm 142 of the yoke assembly thereby providing a rotatable mount for the nozzle assembly on the yoke arm. The housing 150 is made fluid tight with the upper surface of the worm gear 146 by means of a suitable packing ring 156 which, as shown, is carried by a housing which is secured to the housing 150 by screws 149. The lower surface of worm wheel 146 is made fluid tight with the yoke arm 142 by means of sealing rings 158, 159 and 162 carried in corresponding recesses of the worm wheel 146 adjacent to the end of arm 142. As shown in Fig. 9, the worm wheel 146 is actuated by a worm 164 integral with a shaft 172 having three succeeding diameters 174, 176 and 178 in stepped relation to each other. The worm 164 is positioned within roller bearings 166 adjacent to the forward end of the screws of the worm and by the portion 174 of the shaft 172 which is seated within bearings 168. The bearings 166 and 168 are carried by the worm housing 150. The intermediate portion 176 of the shaft 172 is threaded at its lower end and carries a gear 182 positioned adjacent to the threads. The lower side of the gear is provided with an annular recess 184, as best illustrated in Fig. 33, adapted to receive a friction disc 186. A nut 180 is screwed upon the threads against the friction disc 186 thus expanding the disc to engage the gear 182 and thereby frictionally secure the gear to the shaft portion 176. This arrangement provides a safety device for the nozzle elevating gearing system should the orbit of the nozzle become impeded, thereby preventing the normal elevating action of the nozzle.

As shown in Fig. 6, the gear 182 is geared to another gear 188 through an idler gear 192. The idler gear 192 rests upon roller bearings 194 carried by a stub shaft 196 of the gear housing closure plate 198. The gear 188 is secured to a drive shaft 202 of a motor 200 of the type previously described whereby the operator in operating the elevating system actuates one field winding to raise the nozzle and the other field winding to lower the nozzle.

The operation of the elevating system is controlled within the desired operating limits by a control system also shown in Fig. 7. The system includes a worm 206 integral with the portion 178 of the shaft 172. The worm 206 engages a worm wheel 208 carried by a shaft 212. The shaft 212 rests within bearings 211 carried by the closure plate 198 and is provided with an arm 222 so arranged and disposed that upon rotation of the shaft 212 in either direction, responsive to action of the gearing mechanism, it will in due course engage electrical switches 214 and 216 in circuits with the motor 200 thereby stopping the said motor to prevent the operator from exceeding the operational limits of the elevating gearing mechanism.

Referring again to Fig. 8 wherein is shown within the collector ring housing 160 collector rings 224, 226 and 228 separated by insulator rings 232 and 234. These rings are carried by a sleeve 235 having a flange 237 at one end thereof which is insulated from the collector rings by insulator sleeve 242. The sleeve 235 is carried by a hub 236 which is secured to a fluid inlet flange 244 by a plurality of bolts 246. To prevent rotation of the sleeve and rings about the hub, the latter is provided with a flange 239 having passages adapted to receive screws 238 which pass through the corresponding passages of the sleeve flange 237 and rings, thereby rigidly securing same to the hub 236. As shown in Figs. 10, 12, 14 and 16, the flanges of the hub and sleeve together with the collector rings are provided with recesses 241 on their outer periphery which, when aligned, form a passage for receiving electrical conductors which are connected to the collector rings and pass through conduit 258 of the housing 160. The collector rings as shown in Fig. 6 are provided with corresponding brushes 224', 226' and 228' which are secured to an insulating plate 230, Fig. 10, carried by the housing 160. These brushes have conductors which enter the housing 160 through conduit 261. The flange 239 of the hub 236 is offset with one end of the hub and coacts with the upper portion of the collector ring housing 160 to form a housing for a sealing ring 256 which forms a fluid tight seal between the hub 236 and the housing 160. The other end of the hub 236 coacts with an annular inner flange 247 of the sleeve 235 to receive ball bearings 248 carried by the arm 144 of the yoke assembly, thereby providing a rotatable mount for the nozzle assembly on the yoke arm. As shown in Figs. 8 and 13, the inner periphery of the hub 236 is provided with a plurality of recesses adapted to receive sealing rings 255, 257 and 259 which coact with the arm to make the hub fluid tight with the arm 144.

*Trunk housing assembly*

Referring now to Fig. 24, in which is shown the trunk 262 of the yoke assembly 140 seated within the aforementioned trunk housing assembly 270 which, as previously stated, includes the main collector ring housing 280, turret traversing housing 290, and trunk sealing housing 300, all cooperating to house a collector ring assembly 264 circumscribing the yoke trunk 262, ball bearings 302 located adjacent to the lower end of the said collector ring assembly; a turret traversing assembly 305, ball bearings 304 adjacent to its lower end, a trunk sealing assembly 365 and a retaining ring 366 threadedly mounted on the yoke 262 providing vertical support for the said ball bearings, turret traversing assembly and collector ring assembly.

*Main collector ring assembly.*—The collector ring assembly 264 comprises a plurality of collector rings 266, 268, 272, 274 and ground ring 276 insulated from each other by insulator rings 278, 282, 284 and 286. These rings are secured to a collector ring base 263 by means of screws 275 and are insulated from the base by insulator ring 287 and band 294, and from the screws by insulator sleeves 296. The collector rings 266, 268, 272 and 274 are similar in construction to those previously described, but as shown are provided with two recesses 279 on their outer periphery. The ground ring 276 is provided with a flange 277 adapted to be received by the housing cap 292, and has recesses 281 on its outer periphery which, when aligned with corresponding recesses of the collector rings, form passages to the housing conduit 297 for conductors having ends connected to the collector rings. The collector rings are provided with corresponding brushes 266', 268', 272', 274' and ground ring brush 276' carried by an insulator plate 298 and electrically connected to corresponding conductors entering the housing through conduit 296 as best illustrated in Fig. 29.

*Turret traversing assembly.*—Within the worm gear housing 290 of the housing assembly 270 is a turret traversing assembly 305 having intermediate ball bearings 302 and 304, a worm wheel 306 keyed to the yoke trunk 262 by a key 308. Engaging the worm wheel 306 is a worm 310 integral with a shaft 312 having three succeeding diameters 314, 316 and 318 in stepped relation to each other as illustrated in Figs. 26 and 27. The worm 310 and shaft 312 are positioned within a worm housing 290 by roller bearings 322 supporting one end of the worm 310 and ball bearings 324 supporting the other end of the worm at portion 314 of the shaft 312. The bearings 322 and 324 are carried by the worm housing 290. The intermediate portion 316 of the shaft 312 is threaded at the end adjacent to portion 318 of the shaft and has a gear 326 having an annular recess on one side adjacent to the threads for receiving a friction disc 328. A nut 332 is screwed upon the threads against the friction disc 328 expanding same to engage the gear 326 to frictionally secure said gear to the shaft, thereby in operation providing a safety device similar to the safety device for the nozzle elevating gearing system shown in Fig. 33, for the turret traversing system should an obstruction impede the normal traversing movement of the turret. The gear 326 is geared to a gear 334 through an idler gear 372 resting upon roller bearings 336 carried by stub shaft 338 of the gear housing closure plate 330. The gear 334 is secured to a drive shaft 342 of a motor 340 of the type described above, so that in operating the traversing system, the operator actuates one of the field windings of the motor 340 to traverse in one direction and the other field winding to traverse in the opposite direction.

The operation of the traversing system is controlled within its operative limits by a control system including a worm 344 integral with the lower portion 318 of the shaft 312 which engages a worm wheel 346 carried by a shaft 348 supported by bearings 352 and 354 carried by closure plate 330. The shaft 348 is provided with an arm 358 so arranged and disposed that upon rotation of the shaft by the worm 344 in either direction, the arm will engage in due course traversing switches 362 and 364 in circuits with the motor 340 to break the circuits with the said motor.

*Trunk sealing assembly.*—Seated within the trunk sealing housing 300 (Fig. 24) adjacent to the lower end of the trunk 262 is a sealing ring 368 which coacts with a fluid packing ring 372 located intermediate the said sealing ring and retaining ring 366 to make the housing assembly 270 fluid proof with respect to the yoke trunk 262.

Heating port

As shown in Figs. 1 and 2, the fire-fighting turret support 316 is provided with a hot air inlet 374 operatively connected to a source of hot air or hot combustible products. The hot air inlet is adapted to receive a valve system which is actuated responsive to fluid pressure. The valve system includes a valve 380 and cylindrical housing 376 having a pair of spaced webs 378 and 382 so spaced within the cylindrical housing to receive and support, in a horizontal position, a valve stem 384 of the valve 380. One end of the housing 376 is provided with a valve seat 386 adapted to receive the valve 380 having a valve stem 384 which extends within the housing 376 through a helical spring 387, located intermediate the valve 380 and the web 378, and through the webs 378 and 382 where the end thereof is threaded to receive a nut 388 which coacts with the web 382 to act as a stop for the valve 380. In operation, the fluid passing through the turret support 316 closes the valve 380 compressing the helical spring 386 so that when the fluid supply is cut off, the spring opens the valve allowing entrance of the hot air or combustion products.

Control system

The operative control members of the remotely controlled fire-fighting turret are connected in a control system as shown in Fig. 34. These various members are connected with a source of unidirectional power 401 through a switch control box 400, containing control switches 402, 404, 406 and 408, which is connected to the positive side of the source of power 401 through a main conductor 410. The control switches are circularly disposed about the control box with the switches controlling circuits acting in opposition to each other positioned directly opposite each other. The switch control box 400 is provided with a selector switch disc 412 mounted intermediate the ends of a shaft 414 as illustrated in Fig. 35. The shaft 414 is provided with a ball means 416 at one end adapted to be received by a corresponding socket 418 centrally disposed with respect to the switches and carried by the control box 400 to form a ball and socket joint therewith. This selector disc, so arranged with respect to the aforesaid switches, permits the engagement singularly or simultaneously of any one or two successive switches of the control box to energize circuits hereinafter described to raise or lower the nozzle while traversing the turret in either direction.

Control circuits for nozzle elevating assembly

The nozzle elevating assembly is actuated when the controlman moves the switch disc 412 to close control switch 402 making the following circuit in which one side of control switch 402 is connected to the main conductor 410 through a branch conductor 424. Conductor 432 is connected to the other side of control switch 402 and to the collector ring brush 266' of the main collector ring assembly 264 which engages collector ring 266 connected through conductor 434 to one side of a switch 214 having its opposite side connected to the elevating field 420 of the motor 200 by conductor 438. Thus, if the nozzle has been elevated to its limit, the switch 214 is broken by the abovedescribed mechanical control mechanism provided for the elevating gearing mechanism and the circuit remains broken though contact is maintained with control switch 402. If the nozzle has not reached its limit of elevation, the circuit is completed through the armature of the motor 200 thereby actuating the motor to actuate the nozzle elevating mechanism and brake coil 444 which is connected through conductor 446 to collector ground ring 276 and brush 276' to ground 440. To lower the nozzle from its elevated position, the controlman moves the selector switch disc 412 to close control switch 404 to make the following circuit in which one side of control switch 404 is connected to the main conductor 410 through a branch conductor 446. Conductor 452 is connected to the other side of control switch 404 and to the collector ring brush 268' of the main collector ring assembly 264 which engages collector ring 268 connected through conductor 454 to one side of a switch 216 having its opposite side connected to the lowering field 458 of the motor 200 by conductor 462. Thus, if the nozzle has been lowered to its limit, the switch 216 is broken by the above-described mechanical control switch mechanism for the elevating gearing mechanism and the circuit remains broken though contact is maintained with the control switch 404. If the nozzle has not reached its limit, the circuit is completed through the armature of the motor 200 actuating the motor to drive the elevating gearing mechanism through the brake coil 444 which is connected through conductor 446 to collector ring 276 and brush 276' to ground 440.

*Control circuits for turret traversing assembly*

The fire-fighting traversing assembly is actuated in a clockwise movement and controlled by a circuit which is completed when the controlman moves the switch selector disc 412 to close switch 406 which has one side connected to the main conductor 410 through a branch conductor 457, and its other side through conductor 459 connected to one side of a switch 362 having its opposite side connected to the clockwise traversing field 464 of motor 340 by conductor 466. Thus, if the turret has traversed its limit in a clockwise direction, the switch 362 is broken by the above-described mechanical control mechanism for the traversing gearing system and the circuit remains broken though contact is maintained with control switch 406. If the turret has not reached its limit, the circuit is completed through the armature of the motor 340, which actuates the motor to actuate the traversing gearing mechanism through brake coil 472 and ground 480. To traverse in a counter-clockwise direction, the controlman, by means of the selector switch disc 412, closes switch 408 completing a circuit in which one side of control switch 408 is connected to the main conductor 410 through a branch conductor 476 thereof and its other side through conductor 478 connected to one side of a switch 364 having its opposite side connected to the counter-clockwise traversing field 482 of motor 340 by conductor 484. Thus, if the turret has traversed its limit in a counterclockwise direction, the switch 364 is broken by the above-described mechanical control mechanism for the traversing gearing system and the circuit remains broken though contact is maintained with control switch 400. If the turret has not reached its limit, the circuit is completed through the armature of the motor 340, to actuate the motor to drive the above-described traversing gearing system through the brake coil 472 and ground 480.

*Control circuits for the nozzle assembly*

The nozzle is controlled to produce a fire-fighting fog or stream by the circuits which utilize a single pole double throw switch 500, which for convenience may be housed within the switch control box. The pole of the switch is connected to the main conductor 410 through its branch conductor 502. When the pole is in contact with one side of the switch, a circuit is completed with the stream position field 510 of the motor 100. The circuit includes a conductor 504 connecting one side of the switch 500 to a collector ring brush 272' of the main collector ring assembly 264 which engages collector ring 272 connected through conductor 506 to a second collector ring brush 224' engaging a corresponding collector ring 224 connected through conductor 509 to a switch 134 having its other side connected to the stream positioning field 510 of the motor 100 through conductor 512. The switch 134 is controlled by a mechanical control system actuated by the nozzle slide valve gearing system previously described; thus, if the control circuit is closed for too long a period, the switch 134 is broken by the control mechanism to break the circuit after a continuous fire-fighting stream has been produced. If a continuous stream has not been produced, the circuit is completed through the armature of the motor 100 actuating the motor to drive the nozzle slide valve gearing assembly through ground brake coil 532 connected to collector ring 228 by conductor 534 and brush 228' to ground 536. When the pole of the single pole double throw switch 500 is in contact with the opposite side of the switch, the circuit is completed with the fog position field 540 of the motor 100. This circuit includes a conductor 542 connecting to the opposite side of the switch 500, a collector ring brush 274' of the main collector ring assembly 264 which engages a collector ring 274 connected through conductor 544 to a second collector ring brush 226' engaging a corresponding collector ring 226 connected through conductor 548 to one side of a switch 132 having its other side connected to the fog positioning field 540 through conductor 552. The switch 132 is actuated by the mechanical control system previously described for the nozzle stream control system; thus, if a fire-fighting fog has not been produced, the circuit is completed through the armature of the motor 100, actuating the motor to drive the nozzle slide valve gearing system, through the brake coil 532 which is connected to collector ring 228 by conductor 534 and to ground 536 through collector ring brush 228'.

*Operation*

When the fire-fighting turret has been connected to a source of fire-fighting fluid and positioned in a desired location, a controlman, who is positioned with the control box in a safe place remote from the turret, regulates the nozzle assembly to produce either a fire-fighting stream or fog by selectively throwing the pole of the double throw switch. Assuming the nozzle to be in the fog position and that a fire-fighting stream is desired, it is produced by throwing the pole of the double throw switch permitting current to flow from a source thereof through the continuous fire-fighting stream producing circuit of the circuits for the nozzle assembly previously described to the appropriate field of the split field motor, actuating the motor to drive the nozzle slide valve gearing assembly to retract the slide valve from the cylindrical tube producing the desired continuous fire-fighting fog stream.

Inasmuch as the nozzle assembly circuits are provided with limit switches actuated by a bell crank synchronized with the nozzle valve, no further attention of the controlman is required with respect to the double throw switch and full attention may be given to directing the fire-fighting fluid to the desired target. This is accomplished by proper movement of the selector disc of the control box to permit energization of the desired nozzle elevating assembly and turret traversing circuits previously described to actuate the nozzle elevating assembly, and the turret traversing assembly.

When use of the turret is discontinued, the fluid supply is cut off enabling hot combustible products to enter the turret through the heating port provided in the turret support and circulate through the turret and nozzle thereby evaporating the residue of fire-fighting fluid remaining within the turret and nozzle.

Having described my invention, what I claim as new and wish to secure by Letters Patent is:

1. A fire-fighting apparatus comprising, in combination, a nozzle for receiving fire-extinguishing liquid from a supply thereof and directing the liquid onto a fire, mounting means for the nozzle operable for effecting a selected directional adjustment for the nozzle in both vertical and horizontal directions, a conduit for liquid mounted in the nozzle and spaced from the interior of the nozzle for defining a passage for liquid intermediate the conduit and nozzle, both the conduit and the passage communicating with the supply of liquid for conveying liquid through the nozzle, adjustable slide valve means in the nozzle mounted on the conduit and in the said passage for selectively controlling flow of liquid through the conduit and passage, mechanism for adjusting the said slide valve means relative to the nozzle and conduit, a first motor connected to the said adjusting mechanism for driving the latter, a second motor for turning the mounting means for the nozzle for directionally adjusting the nozzle horizontally, transmission mechanism connecting the second motor and mounting means for rotating the latter, a third motor for vertically adjusting the nozzle, transmission mechanism connecting the third motor to the nozzle, each of the said motors having a split field for enabling a selected reversal of direction of operation of each motor for reversing direction of movement of the slide valve, the mounting means for the nozzle, and the elevation of the nozzle, each of the adjusting mechanisms for the slide valve and the transmission mechanisms connecting the second motor to the nozzle-mounting means, and the transmission mechanism connecting the third motor to the nozzle for elevating the nozzle, including control instrumentalities for controllably limiting the movements of the slide valve, the mounting means for the nozzle and vertical movements of the nozzle in reverse directions, a common source of electrical current for all of the aforesaid motors, means connecting the source of current to the split fields of each motor in independent circuits, a common operating station for the motors at a remote location relative to the mounting means for the nozzle, and means at the operating station and common to all of the motor circuits for selectively energizing the circuits from the common source of current for operating selected motors in a selected direction for producing selected adjustments of the nozzle and of the character of liquid discharge from the nozzle.

2. A remote controlled fire-fighting turret comprising, in combination, a nozzle barrel having a discharge end, a rear end, and two fluid inlets positioned directly opposite to each other intermediate the said ends of the nozzle barrel, and a depending cylindrical ring in the nozzle barrel intermediate the fluid inlets and the discharge end of the barrel defining a fog chamber intermediate the discharge end of the barrel and the cylindrical ring, a cap secured to the discharge end of the barrel, a cylindrical conduit tube extending through the barrel to a point past the said cylindrical ring for producing a fire-fighting stream of liquid, the said cylindrical tube defining with the nozzle barrel a liquid passage intermediate the tube and said barrel, flange means integral with the forward end of the cylindrical tube to produce a fog stream, the said flange means comprising a flange having a plurality of annularly disposed passages coacting with a second plurality of passages disposed at an oblique angle therewith to produce an impingement of liquid streams issuing from the passages for obtaining a fog discharge, a slide valve reciprocally mounted on the cylindrical tube, the said slide valve having a closed inner end and being provided with a plurality of fluid inlets adjacent to the said closed end, a vertical annular flange on the slide valve and integral therewith, the said flange being adjacent to a forward end of the slide valve, the said flange coacting with said cylindrical tube and cylindrical ring in the barrel to form an impasse to the said liquid passage when the slide valve is in retracted position, during which coaction the slide valve passages are open permitting fluid to pass through the cylindrical tube to produce a solid fire-fighting discharge stream, and when in the advanced position the said slide valve coacts with the cylindrical tube to close the said fluid inlet, thereby forming an impasse to passage of liquid into the cylindrical conduit tube, during which the slide valve flange is advanced into the fog chamber to permit fluid to flow therethrough to produce a fire-fighting fog, a split field motor for reciprocating the slide valve, transmission mechanism interconnecting the said motor, nozzle barrel, and sleeve valve, control means operatively connected to transmission mechanism defining the operational limits in either direction of the slide valve, a yoke pivotally supporting the nozzle and having a pair of arms, an elevating worm for the said barrel positioned on the yoke, a worm wheel mounted on the nozzle coacting with the said worm to elevate the nozzle about the arms of the yoke, a second split field motor for actuating the worm in reverse directions, transmission mechanism interconnecting the said second motor and worm of the yoke, control means operatively connected to the transmission means defining elevational operative limits of the elevating worm, a housing for the yoke, a support for the housing, a second worm within the housing coacting with a second worm wheel on the yoke for imparting a traversing movement thereto, a third split field motor for actuating the second worm in reverse directions, transmission mechanism interconnecting the third motor and second worm, and a control means operatively connected to the last mentioned transmission mechanism defining the operational limits of the second worm, a source of electrical power and control circuits including the source of power and the split fields of all the aforesaid motors and means for selectively actuating the fields of the split field motors.

3. A remote controlled fire-fighting turret as claimed in claim 2 wherein the transmission mechanism interconnecting the split field motor, nozzle barrel, and slide valve comprises a housing secured to the nozzle barrel, a connecting rod having a forward end and an aft end, an externally splined internally threaded cylinder, the forward end of the connecting rod secured to the slide valve, and the aft end of the connecting rod secured to the externally splined internally threaded cylinder, the splines on the said cylinder adapted to be received in corresponding recesses provided therefor in the said housing, a sealing disc integral with the connecting rod and seating intermediate the fluid inlets and aft end of the nozzle barrel, a worm adapted to be received by the said cylinder, a gear integral with the worm, a second gear carried by the drive shaft of the motor, and an idler gear interconnecting the gears, the said gears being operable responsively to actuation of the motor to actuate the slide valve.

4. A remote controlled fire-fighting turret as claimed in claim 2, in which the control means operatively connected to the transmission means comprises a pair of switches in normally closed series circuits with the fields of the split field motor, a shaft having one end thereof operatively received by the transmission means, a gear secured to the other end, a ring gear, an idler gear, the first-mentioned gear being in turn geared to the ring gear through the idler gear, and a bell crank carried by the ring gear, said bell crank having arms disposed relatively to the switches for selectively controlling the circuits to the fields of the motor.

5. A remote controlled fire-fighting turret as claimed in claim 2, in which the yoke comprises a pair of tubular arms branching from a tubular trunk, a pair of housings one on each arm, the said housings including horizontal cylindrical portions circumscribing the arms, the said housings having an open end adjacent to terminal ends of the arms, closure means for opposite ends of the housings, the said closure means maintaining the horizontal portions of the housings in spaced relation to the arms, and nozzle pivoting means enclosed in the said housings.

6. A remote controlled fire-fighting turret as claimed in claim 2 in which the transmission mechanism interconnecting the second motor and elevating worm comprises a shaft integral at one end with the worm, a first gear, a second gear carried by the drive shaft of the motor, friction means securing the first gear to a portion of the shaft, an idler gear interconnecting the first and second gears, the said friction means comprising an expansible ring of concave cross section carried by the said shaft and adapted to be received in a recess provided therefor in the said gear, a nut carried by said shaft adjacent to the said expansible ring and coacting therewith to expand the ring for engaging the periphery thereof with the shaft and gear.

7. A remote controlled fire-fighting turret as claimed in claim 2, in which the control means operatively connected to the transmission means and defining the elevational operative limits of the elevating worm comprise a shaft having a forward end and an aft end, the forward end being secured to the elevating worm, a control worm integral with the aft end of said shaft, a second shaft, a worm wheel mounted upon the second shaft meshing with the control worm, a control circuit for the said motor, a switch in the control circuit, and an arm carried by the second shaft adapted to actuate the switch at predetermined selected intervals.

8. A fire-fighting turret as claimed in claim 2 in which the housing for the yoke is supported by a housing support, the latter including a housing enclosing traversing mechanism for the yoke and interconnecting a sealing ring housing in which the end of the yoke rotatably seats, and a main collector ring having a housing for the control circuits, the said housings waiting to provide lateral support as well as vertical support to the yoke.

9. A remote controlled fire-fighting turret as claimed in claim 2 in which the turret support comprises a cylindrical tube having broad flanges at each end, the said flanges being provided with a plurality of passages adapted to receive a corresponding plurality of bolts for securing the yoke housing means thereto, a valve seat intermediate the ends of said support, a second cylindrical tube having a pair of webs intermediately spaced between the ends thereof, a second valve including a valve head and stem carried by the webs of the second cylindrical tube, the head of said second valve being adapted to seat within a valve seat in the second cylindrical tube responsive to fluid pressure exerted thereon by fluid passing through the first cylindrical tube, a helical spring carried by the valve stem intermediate the valve head and web adjacent thereto, the said spring when in operation being compressed by the aforesaid fluid pressure and acting when the fire-fighting fluid is cut off to unseat the valve permitting hot combustible products to enter the first cylindrical tube, and means carried by the valve stem coacting with the other web to form a stop for the valve.

10. A fire-fighting turret as claimed in claim 2, in which the housing for the yoke supported by a housing support includes a traversing mechanism housing for the yoke, a sealing ring housing and a main collector ring housing, the traversing mechanism housing connecting the sealing ring housing in which the end of the yoke rotatably seats and the main collector ring housing which houses collector rings for control circuits, the said housings coacting to provide lateral support as well as vertical support to the yoke.

11. A remote controlled fire-fighting turret as claimed in claim 2, in which the yoke housing support comprises a cylindrical tube having broad flanges at each end, the said flanges being provided with a plurality of passages adapted to receive a corresponding plurality of bolts for securing the yoke housing support to one end thereof and a turret carrier to the other end, a valve seat intermediate the ends of said cylindrical tube, a second cylindrical tube having a forward end and an aft end, a pair of webs intermediately spaced between the said ends, a valve including a valve head and stem carried by said webs of the second cylindrical tube, the head of said valve being adapted to seat within the valve seat of the second cylindrical tube responsive to fluid pressure exerted thereon by fluid passing through the first cylindrical tube, a helical spring carried by the valve stem intermediate the valve head and web adjacent thereto, the said spring when in operation being compressed by the aforesaid fluid pressure and acting when the fire-fighting fluid is cut off to unseat the valve permitting hot combustible products to enter the first cylindrical tube, and means carried by the valve stem coacting with the other web to form a stop for the valve.

12. A control for a remotely controlled fire-fighting turret comprising a nozzle, means connected to the nozzle for producing a solid stream discharge of fire-fighting liquid and a fog discharge, selectively, reciprocating means within the nozzle for selectively producing the selected type of discharge, a split field motor for reciprocating the said reciprocating means, transmission mechanism interconnecting the split field motor and reciprocating means, a pair of limit switches defining the limits of operation of the reciprocating means, mechanical control means operable responsively to actuating of the transmission mechanism to selectively engage the switches, a single pole double throw switch remote from the turret, a source of power, and a series circuit for advancing the reciprocating means, the said circuit including a field of the split field motor, one of the limit switches, one side of the single double throw switch, and the source of power; a second series circuit for retracting the reciprocating means, the said second circuit including a second field of the split field motor, the remaining limit switch, the other side of the single pole double throw switch, and the source of power; a yoke supporting the nozzle, the said yoke including a pair of tubular arms branching from a tubular stock, a worm wheel carried by the nozzle, a worm carried by an arm of the yoke engaging the worm wheel to elevate and to lower the nozzle, selectively, a second split field motor, a second transmission means interconnecting the worm and second motor, a second pair of limit switches defining the operable limits of the worm wheel, mechanical control means operable responsively to actuation of the transmission means to selectively engage the second pair of limit switches, a pair of control switches remote from the turret, and a third series circuit for elevating the nozzle, the said circuit including a field of the second split field motor, one of the second pair of limit switches, one of the said pair of control switches and the source of power; a fourth series circuit for lowering the nozzle, the said circuit including a second field of the second split field motor, the other of the second pair of limit switches, the other control switch of the said pair, and the source of power; a housing adapted to receive the stock of the yoke, a worm wheel rigidly secured to the stock, a worm carried by the said housing adapted to engage the worm wheel for reciprocally rotating the yoke, a third split-field motor, third transmission means interconnecting the worm and motor, a third pair of limit switches, mechanical control means operable responsive to actuation of the third transmission means to selectively engage the third pair of limit switches, a second pair of control switches remote from the turret, and a fifth series circuit for rotating the yoke in a clockwise direction, the said circuit including a field of the third split field motor, one of the third pair of limit switches, one of the second pair of control switches and the source of power; a sixth series circuit for rotating the yoke in a counterclockwise direction, the said sixth circuit including a second field of the third split field motor, the other of the third pair of limit switches, the other of the second pair of control switches and the source of power; selector means for selectively energizing all of the said circuits, and a control box housing the aforesaid control switches, and the switch selector means, the said control switches being disposed within the control box to permit the selector means to engage selectively any one control switch, and two successive control switches simultaneously.

13. A remote controlled fire-fighting turret as claimed in claim 2 wherein the transmission mechanism interconnecting the split field motor, nozzle barrel, and slide valve comprises a housing secured to the nozzle barrel, a connecting rod secured to one end of the slide valve, and an externally splined internally threaded cylinder, splines on the cylinder being adapted to be received in corresponding recesses provided therefor in the housing secured to the nozzle barrel, a sealing disc integral with the connecting rod and seating intermediate the fluid inlets and aft end of the barrel, a worm adapted to be received by the said cylinder integral therewith, and a gear meshing with a gear carried by the drive shaft of the motor through an idler gear.

14. A remote controlled fire-fighting turret as claimed in claim 2 in which the control means operatively connected to the transmission means comprises a pair of switches in series circuits with the split field motor, a shaft having one end thereof operatively received by the transmission means, a gear secured to the other end, the said gear being in turn geared to a ring gear through an idler gear, and a bell crank carried by the ring gear, the arms of which bell crank are adapted to break the switches, selectively, for breaking the circuits to the motor.

15. A remote controlled fire-fighting turret as claimed in claim 2, in which the yoke comprises a pair of tubular arms branching from a tubular stock, a pair of housings, one on each arm, the said housings including horizontal cylindrical portions circumscribing the arms, the said housings having an open end adjacent to terminal ends of the arms, closure means for opposite ends of the housings, the said closure means maintaining the horizontal portion of the housings in spaced relation to the arms, and nozzle-pivoting means enclosed in the said housings.

16. A remote controlled fire-fighting turret as claimed in claim 2 in which the transmission mechanism interconnecting the second motor and elevating worm comprises a shaft integral at one end with the worm, a gear, friction means securing the gear to a portion of the shaft, the said gear being in turn geared through an idler gear to a gear carried by the drive shaft of the second motor, the said friction means comprising an expansible ring of concave cross section adapted to be received in a recess provided therefor in the gear, a nut adjacent to the ring and carried by the shaft, the said nut being operable to expand the ring to engage the peripheries thereof with the shaft and gear.

17. A remote controlled fire-fighting turret as claimed in claim 2, in which the control means operatively connected to the transmission means and defining the elevational limits of the elevating means comprises a shaft, a worm and a shaft for the worm, a second shaft, a worm wheel mounted upon the second shaft meshing with the worm, a control circuit for the said motor, a switch in the control circuit, and an arm carried by the second shaft adapted to actuate the switch at predetermined selected intervals.

18. A control for a remotely controlled fire-fighting turret comprising a nozzle, means connected to the nozzle for producing a solid stream discharge of fire-fighting liquid and a fog discharge, selectively, reciprocating means within the nozzle for selectively producing a desired type of discharge stream, a split field motor for reciprocating said reciprocating means, transmission mechanism interconnecting the split field motor and reciprocating means, a pair of limit switches defining the limits of operation of the reciprocating means, mechanical control means operable responsively to actuation of the transmission mechanism to selectively engage the switches, a single pole double throw switch remote from the turret, and a series circuit for advancing the reciprocating means, the said circuit including a field of the split field motor, one of the limit switches, one side of the single pole double throw switch, and a source of power; a second series circuit for retracting the reciprocating means, the said second circuit including a second field of the split field motor, the remaining limit switch, the other side of the single pole double throw switch, and the source of power; a yoke supporting the nozzle, the said yoke including a pair of tubular arms branching from a tubular stock, a worm wheel carried by the nozzle, a worm carried by an arm of the yoke engaging the worm wheel to elevate and to lower the nozzle, selectively, a second split field motor, a second transmission means interconnecting the worm and second motor, a second pair of limit switches defining the operable limits of the worm wheel, mechanical control means operable responsively to actuation of the transmission means to selectively engage the second pair of limit switches, a pair of control switches remote from the turret, and a third series circuit for elevating the nozzle, the said circuit including a field of the second split field motor, one of the second pair of limit switches, one of the said pair of control switches and the source of power; a fourth series circuit for lowering the nozzle, the said circuit including a second field of the second split field motor, the other of the second pair of limit switches, the other control switch of the said pair and the source of power; a housing adapted to receive the stock of the yoke, a worm wheel rigidly secured to the stock, a worm carried by the said housing adapted to engage the worm wheel for reciprocally rotating the yoke, a third split field motor, third transmission means interconnecting the worm and motor, a third pair of limit switches, mechanical control means operable responsive to actuation of the third transmission means to selectively engage the third pair of limit switches, a second pair of control switches remote from the turret, and a fifth series circuit for rotating the yoke in a clockwise direction, the said circuit including a field of the third split field motor, one of the third pair of limit switches, one of the second pair of control switches and the source of power; a sixth series circuit for rotating the yoke in a counterclockwise direction, the said sixth circuit including a second field of the third split field motor, the other of the third pair of limit switches, the other of the second pair of control switches and the source of power; selector means for selectively energizing all of said circuits, and a control box housing the aforesaid control switches, and the switch selector means, the said control switches being disposed within the control box to permit the selector means to engage, selectively, any one control switch, and two successive control switches simultaneously.

19. A remote controlled fire-fighting turret comprising, in combination, a nozzle barrel having a discharge end and also having two liquid inlets positioned directly opposite to each other intermediate the ends of the nozzle barrel, and a depending cylindrical ring in the nozzle barrel intermediate the fluid inlets and the discharge end of the barrel defining a fog chamber intermediate the discharge end of the barrel and said cylindrical ring, a cap secured to the discharge end of the barrel adjacent to the cylindrical ring, the said cap having a cylindrical conduit tube for delivering fire-extinguishing liquid through the nozzle and extending longitudinally through the barrel for producing a fire-fighting stream of liquid and defining with the barrel a liquid passage intermediate the conduit tube and barrel, flange means integral with the discharge end of the cylindrical conduit tube to produce a fog stream, the said flange means comprising a plurality of annularly disposed passages coacting with a second plurality of passages forming an oblique angle therewith to produce an impingement of liquid streams issuing therefrom for obtaining a fog discharge, a slide valve reciprocally mounted upon the cylindrical conduit tube, the said slide valve being closed at one end and provided with a plurality of fluid inlets adjacent to the closed end, and having a vertical annular flange integral with the slide valve adjacent to an opposite end thereof, the said vertical annular flange when the slide valve is in retracted position coacting with the said cylindrical conduit tube and with the cylindrical ring of the barrel to form an impasse to the fog-producing chamber, during which coaction the slide valve passages are open to permit fluid to pass through the cylindrical tube for producing a solid fire-fighting discharge stream, the said slide valve when in advanced position coacting with the cylindrical conduit tube to close the said fluid inlets, and preventing passage of liquid into the cylindrical conduit tube, in which advanced position of the slide valve the said vertical flange thereon is positioned in the fog chamber, thereby permitting liquid to flow therethrough to produce a fire-fighting fog, a split field motor for reciprocating the slide valve, transmission mechanism interconnecting the said motor, nozzle, and slide valve, control means operatively connected to the transmission mechanism defining the operational limits in either direction of the slide valve, a yoke pivotally supporting the nozzle and having a pair of arms, an elevating worm mounted on the yoke, a worm wheel mounted on the nozzle coacting with the said elevating worm to elevate the nozzle about the arms of the yoke, a second split field motor for actuating the worm in reverse directions, selectively, transmission mechanism interconnecting the said second motor and worm on the yoke, control means operatively connected to the transmission means defining elevational operative limits of the elevating worm, a housing for the yoke, a support for the housing, a second worm within the housing coacting with a second worm wheel upon the yoke for imparting a traversing movement thereto, a third split field motor for actuating the second worm in reverse directions, transmission mechanism interconnecting the third motor and second worm, control means operatively connected to the last-mentioned transmission mechanism defining the operational limits of the second worm, a source of current, electrical control circuits including the source of current and the split fields of each of the aforesaid motors for selectively actuating the fields of the split field motors, and common selector means for the said circuits for energizing the circuits selectively, the selector means being under control of an operator at a station remote from the yoke.

20. A fire-fighting apparatus comprising, in combination, a nozzle, means secured to the nozzle for producing, selectively, a fire-fighting stream and a fog stream of fire-fighting liquid, selector means movably mounted within the nozzle for effecting the selective production of the said solid stream and the said fog stream, a motor, a transmission mechanism interconnecting the said motor, nozzle and selector means, control means operatively connected to the transmission means defining operational limits of movement of the selector means, a yoke pivotally supporting the nozzle, elevating means upon the yoke coacting with corresponding means upon the nozzle to elevate the nozzle, a second motor, a transmission mechanism interconnecting the said second motor and elevating means on the yoke, control means operatively connected to the transmission means for controllably limiting amplitudes of elevational movements of the elevating means, a support for supporting a housing for the yoke, traversing means within the said yoke housing coacting with corresponding means upon the yoke to rotate the yoke, a third motor, a transmission mechanism interconnecting the third motor and traversing means, and control means operatively connected to the said transmission mechanism interconnecting the third motor and traversing means for the yoke for controllably limiting and defining traversing movements of the yoke, a source of electrical current, electrical control circuits including the said source of current for selectively activating the motors, and common selector means for the control circuits for effecting energization of selected circuits to produce predetermined directional movements of the nozzle and yoke and a selected discharge stream from the nozzle, the selector means being positioned at a station remote from the nozzle and yoke and being controllable by an operator at the said remote station.

References Cited in the file of this patent

UNITED STATES PATENTS

| | | |
|---|---|---|
| 1,468,998 | Dolan | Sept. 25, 1923 |
| 1,966,324 | Ward | July 10, 1934 |
| 2,265,063 | Crumley | Dec. 2, 1941 |
| 2,698,664 | Freeman | Jan. 4, 1955 |
| 2,698,665 | Freeman | Jan. 4, 1955 |